(12) United States Patent
Pfister et al.

(10) Patent No.: US 8,403,564 B2
(45) Date of Patent: *Mar. 26, 2013

(54) LINEAR MOTION DEVICE COMPRISING PROJECTION-FREE RETURN PASSAGE

(75) Inventors: Steffen Pfister, Niederwerrn (DE); Bernhard Keller, Kaisten (DE)

(73) Assignee: Robert Bosch GmbH, Stuttgart (DE)

( * ) Notice: Subject to any disclaimer, the term of this patent is extended or adjusted under 35 U.S.C. 154(b) by 373 days.

This patent is subject to a terminal disclaimer.

(21) Appl. No.: 12/704,141

(22) Filed: Feb. 11, 2010

(65) Prior Publication Data

US 2010/0209029 A1   Aug. 19, 2010

(30) Foreign Application Priority Data

Feb. 16, 2009 (DE) .......................... 10 2009 009 012

(51) Int. Cl.
*F16C 29/06* (2006.01)
*F16C 29/04* (2006.01)

(52) U.S. Cl. .......................................... 384/45; 384/49

(58) Field of Classification Search ................ 384/7, 43, 384/44, 45, 49, 50, 56, 57; 74/89.32, 89.33, 74/424.86, 424.87
See application file for complete search history.

(56) References Cited

U.S. PATENT DOCUMENTS

| | | | |
|---|---|---|---|
| 3,044,835 A * | 7/1962 | Hurd | ............................... 384/45 |
| 4,921,361 A | 5/1990 | Steeves | |
| 5,193,914 A | 3/1993 | Tanaka | |
| 6,371,648 B1 | 4/2002 | Kato et al. | |
| 6,675,669 B2 * | 1/2004 | Sekiya et al. | .............. 74/424.87 |
| 7,798,716 B2 * | 9/2010 | Haub | ............................... 384/13 |
| 2006/0098903 A1 | 5/2006 | Wang et al. | |
| 2007/0189646 A1 | 8/2007 | Koeniger et al. | |
| 2010/0206104 A1 * | 8/2010 | Pfister et al. | .................. 74/89.44 |
| 2010/0206113 A1 * | 8/2010 | Pfister et al. | ............... 74/424.82 |
| 2010/0209027 A1 * | 8/2010 | Pfister et al. | ..................... 384/13 |
| 2010/0209028 A1 * | 8/2010 | Pfister et al. | ..................... 384/43 |

FOREIGN PATENT DOCUMENTS

| | | |
|---|---|---|
| DE | 199 56 296 | 7/2000 |
| DE | 102 27 716 | 1/2004 |
| DE | 10 2006 007 067 | 8/2007 |
| EP | 1 517 056 | 3/2005 |

* cited by examiner

*Primary Examiner* — Richard W Ridley
*Assistant Examiner* — Adam D Rogers
(74) *Attorney, Agent, or Firm* — Michael J. Striker

(57) ABSTRACT

A linear motion device has a first assembly and a second assembly which is linearly movable relative to the first assembly. A first rolling surface which extends in a longitudinal direction is provided on the first assembly and is situated opposite a second rolling surface provided on the second assembly. A row of rolling elements is located between the first and second rolling surfaces. The first assembly includes a single-pieced, first body and a return assembly and a return passage being provided in the first body A curved deflection passage is located entirely within the deflection assembly and connects the first rolling surface to the return passage such that the rolling elements circulate endlessly A projection that engages in the return passage is provided on the deflection assembly.

15 Claims, 9 Drawing Sheets

LINEAR MOTION DEVICE COMPRISING PROJECTION-FREE RETURN PASSAGE

CROSS-REFERENCE TO A RELATED APPLICATION

The invention described and claimed hereinbelow is also described in German Patent Application DE 10 2009 009 012.6 filed on Feb. 16, 2009. This German Patent Application, whose subject matter is incorporated here by reference, provides the basis for a claim of priority of invention under 35 U.S.C. 119(a)-(d).

BACKGROUND OF THE INVENTION

The present invention relates to a linear motion device.

Linear motion devices of that type are known, e.g., as bearing rail guides or roller rail guides, in which case the first assembly is the guide carriage, and the second assembly is the guide rail. However, the present invention is also usable in linear modules, in which a linear guide having an assigned drive device is integrated to form one assembly. Potential applications also include rolling-element screw drives, in which the first assembly is formed by the nut, and the second assembly is formed by the threaded spindle.

U.S. Pat. No. 5,193,914 makes known a linear motion device in the form of a roller rail guide. According to FIG. 1 in U.S. Pat. No. 5,193,914, the linear motion device includes a first assembly 1 in the form of a guide carriage. The first assembly is movable longitudinally relative to a second assembly 2 in the form of a guide rail. For this purpose, four first rolling surfaces 9; 10; 11; 12 that extend in a longitudinal direction and are situated opposite second rolling surfaces 5; 6; 7; 8 on the second assembly are provided on the first assembly. A row of roller-shaped rolling elements that may circulate endlessly in the first assembly and in the guide carriage is situated between the aforementioned rolling surfaces. Four return passages 15; 17; 20; 21 are provided in the first assembly for this purpose. The first assembly includes a first body, on each of the two longitudinal end faces of which a deflection assembly is provided, it being possible to install the deflection assemblies as a whole. According to FIGS. 6 and 7 of U.S. Pat. No. 5,193,914, four curved deflection passages 14; 16; 18; 19 that connect the first rolling surfaces to the assigned return passages are provided in each deflection assembly 13, thereby producing an endless circulation path. To ensure that the deflection passages are oriented toward the return passages substantially projection-free, projections 62 that engage in the return passage are provided on the return assemblies. For this purpose, a recess that is bounded by surfaces 39; 40, as shown in FIG. 3, is provided in return tube 70, in which the corresponding return passage is formed.

The disadvantage of U.S. Pat. No. 5,193,914 is that a separate return tube is required. In addition to the higher manufacturing costs involved, this has the disadvantage that adequate space for its installation must be provided in front of and behind the first assembly. This is not always available, in particular, in the case of linear modules of the type made known, e.g., in DE 10 2006 007 067 A1. Although it is also possible to form the recess required for the orienting projection directly in the first assembly from the longitudinal side of the first assembly using a separate working step, this is not always possible given the tight spaces involved, and it is expensive.

SUMMARY OF THE INVENTION

The object of the present invention is to provide a linear motion device, in the case of which the countercontour required for the orienting projection may be manufactured in a particularly cost-favorable manner, in particular under tight conditions which typically occur in linear modules. In particular, the separate return tube is eliminated in this case. Moreover, the transition region between the curved deflection passage and the return passage should be designed to be particularly smooth, thereby enabling the rolling elements to roll in the linear motion device in a particularly quiet and low-wear manner.

This object is attained by situating the return passage completely and directly in the first body; the projection of the deflection assembly extends in the longitudinal direction in a finger-like manner, and the return passage includes a groove that is adapted to the finger-type projection, and into which the aforementioned projection engages. According to this proposal, a return tube is eliminated, and the return passage is formed directly in the first body. The return passage should also be formed entirely in the first body, that is, enclosed on all sides by the latter, so that the linear motion device produces very little noise, as is the case with the linear motion device according to U.S. Pat. No. 5,193,914. The engagement contour for the orienting projection is designed in the shape of a groove. To ensure that this groove only minimally affects the guidance of the rolling elements in the return passage, the former should be designed to be as narrow as possible. The orienting projection is therefore designed as a finger-type projection, i.e., its length should be markedly greater than its width.

The adapted groove may extend along the entire length of the return passage which preferably has a substantially constant cross-sectional profile along the entire length. The intention, in particular, is to manufacture the body out of aluminum via extrusion, thereby making it possible to design practically any cross-sectional shape of the return passage in a cost-favorable manner. After extrusion, it is highly preferable that the return passage not undergo any further machining. Given that it is manufactured via extrusion, the return passage has a substantially constant cross-sectional profile along the entire length of the first body. As a result, the groove according to the present invention also extends along the entire length of the return passage. An embodiment of this type is considerably more cost-favorable than an embodiment in which the grooves extend only in the end region of the return passage since, in the latter case, the grooves would have to be created in a separate working step, e.g., using a material-removing machining procedure such as milling.

Balls may be provided as the rolling elements, and the width of the grooves is between 10% and 60% of the ball diameter. This width of the grooves ensures that the finger-type projections have adequate stiffness to perform their orienting function, and that guide surfaces that are large enough to guide the rolling elements are still provided in the return passage at a distance from the grooves.

The finger-type projection may include at least one guide surface that faces the rolling elements, and that is situated, at the front end of the finger-type projection facing away from the deflection assembly, such that it is recessed into the groove so far that it is unable to come in contact with the rolling elements. The finger-type projection does not extend along the entire length of the return passage, and so it includes a front longitudinal end face. The purpose of the proposed measure is to ensure that this front longitudinal end face is recessed in the groove so far that the rolling elements coming from the return passage and entering the curved deflection passage are unable to collide therewith. Collisions of this type would interfere with the circulation of the rolling elements, and it would produce noise, which is to be avoided.

The guide surface may be designed slanted relative to the course of the return passage, and, on the front end of the finger-type projection, the guide surface is situated further from the central axis of the return passage than on the opposite, rear end of the finger-type projection. The intention, in particular, is for the guide surface at the rear end of the finger-type projection to extend out of the assigned groove, thereby preventing the rolling elements from touching the guide surface of the return passage in this region. If it is not possible to attain this preferred state due to tolerances, then it is at least intended for the guide surfaces of the return passage to extend beyond the finger-type projections only to a very small extent. The purpose of the aforementioned measures is to prevent the rolling elements coming from the curved deflection passage and entering the return passage from colliding with the longitudinal end face of the first body in the region of the finger-type projection.

Spherical rolling elements may be provided, and the finger-type projection has a U-shaped cross section having a base and two U-legs, on each of the end faces of which a guide surface is provided; the length of the U-legs increases from the front end toward the rear end of the finger-type projections, preferably in a constant manner. The guide surfaces, which are slanted relative to the course of the return passage, are therefore formed by the end faces of the U-legs. Since they are very narrow, the ball always touches the guide extension substantially only at two points, and so it is always guided on the guide extension in a statically defined manner, even when the finger-type projection has finishing inaccuracies.

The finger-type projection may bear against the bottom of the assigned groove, at least in sections. The purpose is to attain a defined position of the finger-type projection. This embodiment is particularly advantageous in conjunction with an embodiment in which the guide surface on the finger-type projections has a defined position relative to the groove.

At least two finger-type projections may be provided that are distributed substantially equidistantly around the circumference of the assigned return passage, and each of which engages in a separate groove. Via this embodiment, it is made possible for the finger-type projections to orient the deflection assembly relative to the first body in any transverse direction relative to the longitudinal axis. To avoid making installation of the deflection assembly unnecessarily difficult, the number of finger-type projections is kept as low as possible.

The latter embodiment is particularly advantageous in conjunction with the embodiment in which guide surfaces that are slanted relative to the course of the return passage are provided on the finger-type projections. In the latter embodiment, the collision between the longitudinal end face of the first body and the finger-type projections is prevented only in the region of the finger-type projection. By using several finger-type projections, it is possible to rule out the related collision around the entire circumference of the return passage. When spherical rolling elements are used, it is sufficient to use three finger-type projections in order to attain the desired effect.

All finger-type projections and the assigned grooves are preferably identical in design so that the rolling elements are touched evenly on all sides. This results in a particularly smooth, quiet running of the rolling elements.

A flexible tube may be provided that limits a flexible passage for the rolling elements, the finger-type projection being provided on a front end of the flexible tube; the opposite, rear end of the flexible tube is fastened to the deflection assembly, and therefore the flexible passage leads into the assigned deflection passage. As mentioned above, the return passage should be manufactured, particularly preferably, via extrusion and without any subsequent machining. The problem results that the return passage usually has a significant position error. The position of the return passage relative to the first rolling surface in particular is critical in this regard. This must be matched exactly to the assigned curved deflection passage to ensure that a projection-free transition may be ensured at both ends. The aforementioned position errors of the return passage make this impossible, however. Via the flexible tube that is provided, this production-related offset may be compensated for without the presence of any steps in the path of the rolling elements that could interfere with the circulation of the rolling elements. The flexible tube is fastened at the rear end in the deflection assembly, and it engages at the front end via the finger-type projection in the return passage. Via this measure, the bending required to compensate for the aforementioned offset is induced in the flexible tube. Elastic bending intended in particular. It should be noted that, in this embodiment as well, a plurality of finger-type projections is preferably used, thereby ensuring that the aforementioned bending may take place in any transverse direction.

The flexible tube may include at least one radial window. It has been shown that even a flexible tube made of plastic has relatively high stiffness, and so the rigidity of the finger-type projections is often not sufficient to bend the flexible tube to an adequate extent.

The purpose of the radial window is to reduce the resistance of the flexible tube to bending to the extent that the necessary bending may be attained via the finger-type projections. In determining the size and number of windows, care must be taken to ensure that the rolling elements are still adequately guided by the rest of the tube.

A plurality of radial windows may be distributed around the circumference of the flexurally resilient tube, and therefore the windows define segments in the flexurally resilient tube, the segments being situated in extension of the finger-type projections. As a result, it is ensured that the finger-type projections are connected to the aforementioned segments with a level of stiffness that is sufficient to induce the aforementioned bending, while the entire flexible tube has relatively minor stiffness. Given that the segments are situated in extension of the finger-type projections, it is likewise ensured that the guide surfaces on the finger-type projections may be continued smoothly onto the segments, thereby ensuring that no interferences are present that could interfere with the circulation of the rolling elements.

The finger-type projection and the flexible tube may be designed as a single piece in the form of a separate transfer part. Despite its relatively complex shape, this component may be made of plastic using an injection-molding procedure because it has hardly any undercuts, and forming undercuts using this procedure is a complex undertaking. The transfer part is therefore cost-favorable. At the same time, the dimensions of the transfer part are mainly dependent only on the ball diameter, thereby ensuring that the same component may be used in many linear motion devices having different designs, provided the same rolling elements are used in them. The manufacturing costs are reduced further as a result. Moreover, the remaining deflection assembly is simplified via the separate deflection part to the extent that it may also be easily manufactured using a plastic injection-molding procedure.

The flexible tube may be accommodated in a conical recess in the deflection assembly. The flexible tube is therefore fastened to the deflection assembly in the region of the conical recess having the smallest diameter. In contrast, the remaining region of the conical recess has a larger diameter, and therefore provides the space required for the bending deformation of the flexible tube, and, in fact, evenly in all transverse directions. This arrangement saves a great deal of space and may be easily manufactured using a plastic injection-molding procedure.

An end face, which is adjacent to the finger-type projection, of the flexible tube may bear against the first body. Via the conical recess, in combination with the first body, the position of the flexible tube and, thus, the position of the entire transfer part is therefore fixed in the longitudinal direction without the need for any separate, elaborate fastening contours on the deflection assembly or on the first body. The end face of the transfer part is preferably flat in design, similar to the assigned end face of the first body.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
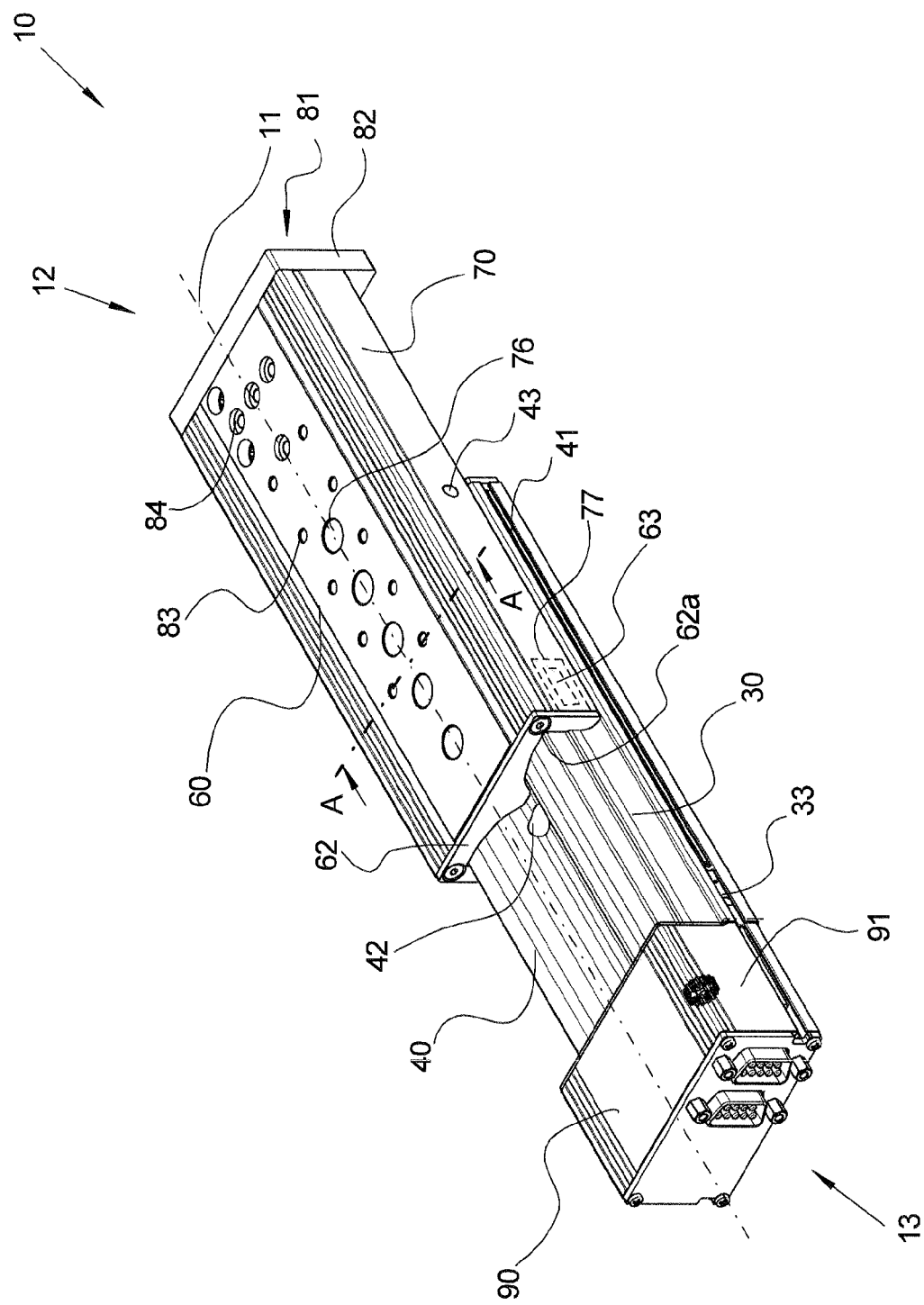
FIG. 1 shows a perspective view of a linear motion device according to the present invention.

FIG. 1 shows a linear motion device 10, according to the present invention, in the form of a linear module. The linear motion device includes a first assembly 30 in the form of a housing that extends in a longitudinal direction 11. Furthermore, a second assembly 60 is provided in the form of a table part, which is movable longitudinally relative to first assembly 30. Second assembly 60 includes a second body 70 which is composed of aluminum, on front end 12 of which a fastening plate 82 is provided that is always located ahead of the front end of first assembly 30 regardless of the position of the second assembly. Fastening plate 82 is a flat panel composed of aluminum, which, similar to second body 60, includes various fastening means 81 in the form of threaded bores 83 and through bores 84, thereby enabling fastening means 81 to be fastened to a higher-order assembly (not depicted).

First assembly 30 includes a first body 40 which is likewise composed of aluminum. Through bores 42 are provided, as fastening means, in first body 40, thereby enabling first assembly 30 to be fastened to a lower-order assembly (not depicted). Since fastening means 42 of first assembly 30 are partially covered by second assembly 60, various continuous installation bores 76 are provided in the latter, via which screw bolts may be inserted into through bores 42 in first assembly 30.

A stripper plate 62, which is composed of steel sheet, is installed via fastening screws 62a on rear end 13 of second body 70. Stripper plate 62 is situated close to first body 40 with minimal clearance, thereby substantially preventing foreign objects from entering the space between first assembly 30 and second assembly 60. In addition, stripper plate 62 is used to close a magnet recess 77 located in the end face (depicted in a basic schematic manner) of second body 70, in which a permanent magnet 63 (depicted in a basic schematic manner) is accommodated. The magnetic field of permanent magnet 63 may be detected by one or more sensors 33 which may be installed in any longitudinal position in an undercut sensor groove 41 which extends in longitudinal direction 11. As a result, one or more positions of second assembly 60 relative to first assembly 30 may be detected by a higher-order control device (not depicted).

A drive assembly 90 is provided at rear end 13 of first body 40, using which second assembly 60 may be moved relative to first assembly 30. However, FIG. 1 only shows gearbox housing 91 of drive assembly 90 which will be explained in greater detail with reference to FIG. 4.

Figure 2:
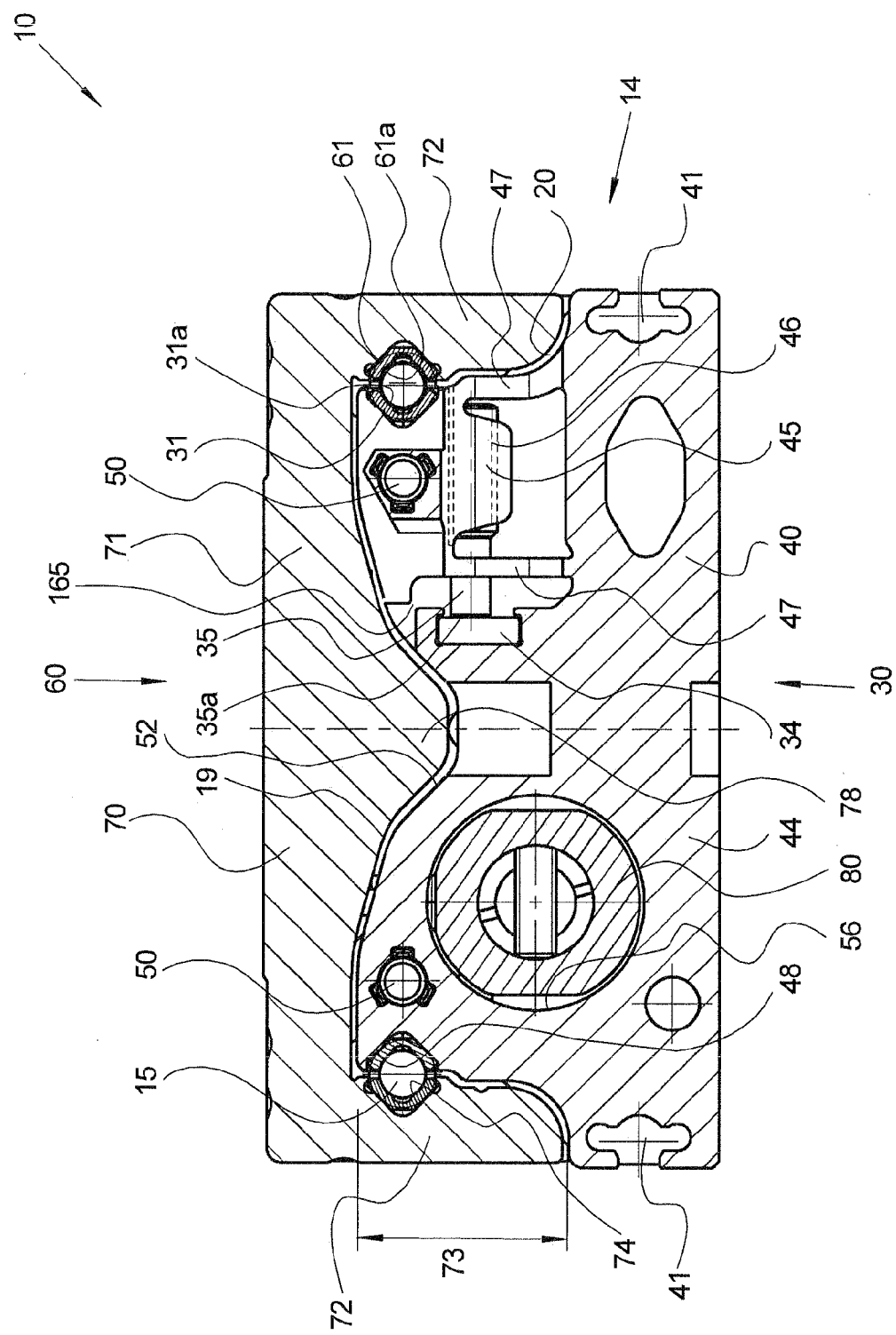
FIG. 2 shows a cross section of the linear motion device depicted in FIG. 1; the cutting plane is labeled A-A in FIG. 1.

FIG. 2 shows a cross section of linear motion device 10. Shown is the entire U-shaped design of second body 70 including a base 71 and two U-legs which extend perpendicularly away therefrom. A second rolling surface part 61 is provided on each of the opposite inner sides of the U-leg. Second rolling surface part 61 is a profiled element that extends in the longitudinal direction, and that has a constant, substantially V-shaped cross section. Second rolling surface part 61, which is composed of hardened roller bearing steel, is provided on the inner side of the V shape with a second rolling surface 61a that is designed with a cross-sectional profile in the shape of a Gothic arch, and so spherical rolling elements 15 touch second rolling surface 61a at two points in a known manner. A first rolling surface part 31, which is designed identically to second rolling surface part 61 except in terms of length, is situated opposite second rolling surface part 61. Rolling elements 15 may therefore roll between first rolling surface 31a and second rolling surface 61a, and so second assembly 60 is supported on first assembly 30 in a longitudinally moveable manner. First body 40 and second body 70 are each fabricated from a raw part that is manufactured of aluminum via extrusion, and the cross-sectional profile formed during extrusion largely corresponds to the cross-sectional profile shown in FIG. 2. Reference is made below to the geometries that are attained via machining after the extrusion process is carried out. Reference is made mainly to accommodating recesses 48; 74, in which first rolling surface parts 31 and second rolling surface parts 61 are accommodated in a form-locked manner. Accommodating recesses 48; 74 must be adapted exactly to assigned rolling surface parts 31; 61, and they must be very straight so that the rolling guidance functions in a stiff and accurate manner. They were therefore formed in the related raw part via milling.

Figure 7:
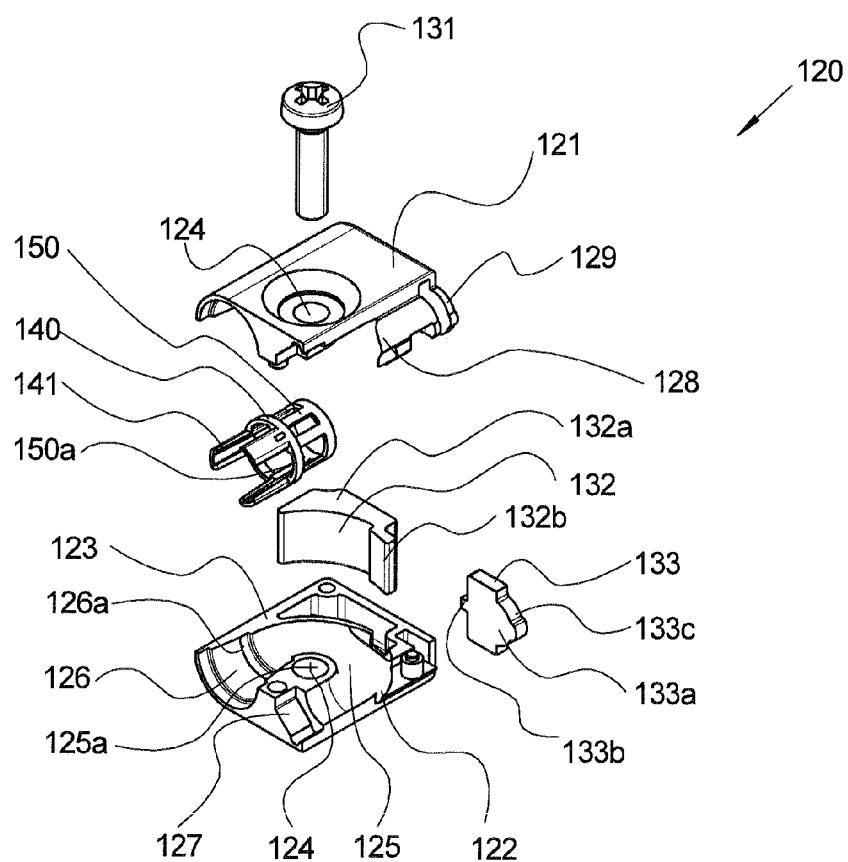
FIG. 7 shows an exploded view of the deflection assembly of the rolling element circuit depicted in FIG. 6.
Figure 9:
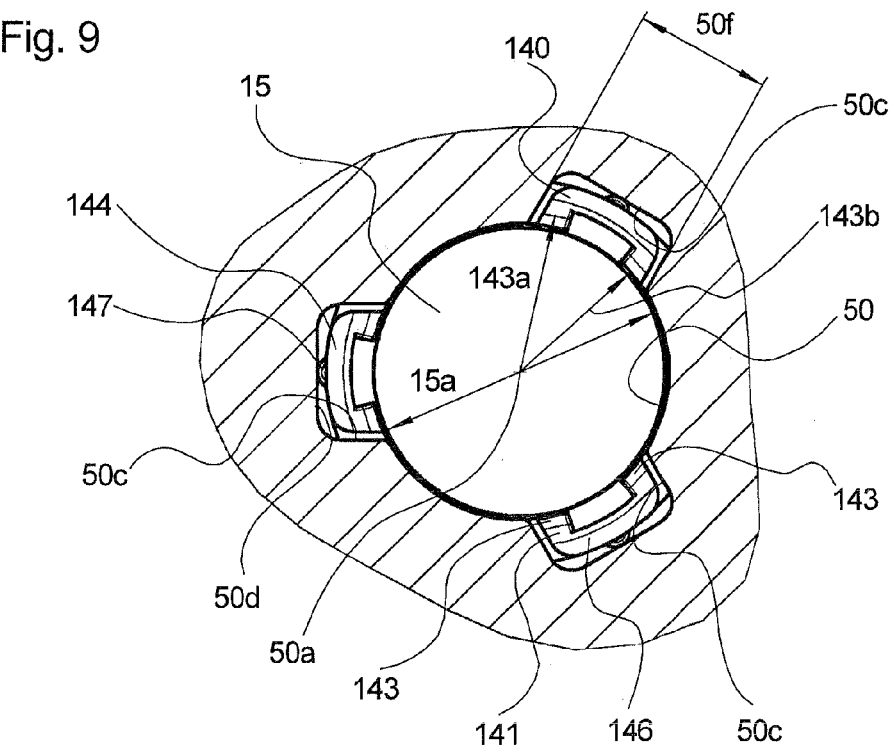
FIG. 9 shows a cross section of a return passage with the transfer part inserted.

A return passage 50, which is manufactured via extrusion without any post-machining, is assigned to every first rolling surface 31. Return channel 50, the cross-sectional shape of which is described in greater detail with reference to FIG. 9, is connected at either end via a curved passage (number 125; FIG. 7) to assigned first rolling surface 31a, thereby enabling rolling elements 15 to circulate endlessly.

First rolling surface part 31, which is shown on the right in FIG. 2, is accommodated on an adjustment section 45 of first body 40, which may be displaced relative to base section 44 of first body 40, on which the fastening means (number 42; FIG. 1) for the lower-order assembly are provided, thereby enabling the preload of the rolling guidance to be adjusted. To this end, adjustment section 45 is connected as a single piece to base section 44 via two flexurally resilient segments 47 that extend in the longitudinal direction. Adjustment section 45 includes an adjusting means in the form of a screw bolt 35 that is screwed into a thread 46 (depicted in a basic schematic manner) of adjustment section 45. Since screw bolt 35 is covered by second assembly 60, an opening (number 43, FIG. 1) is provided in the latter, thereby enabling screw bolt 35 to be adjusted, e.g., using an Allen key. End face 35a of the screw bolt bears via a separate rectangular steel strip 34 against base section 44. Steel strip 34 is needed to prevent screw bolt 35 from plastically deforming the soft aluminum of first body 40, which would result in a reduction in the preload on rolling elements 15. Aforementioned flexurally resilient segments 47 are each situated parallel to U-legs 72 of second assembly 60, and the screw axis of screw bolt 35 is oriented perpendicular thereto, thereby providing an adjustment device that is suitable for adjusting the preload.

It is also pointed out that first body 40 is situated opposite to second body 70 with slight equidistant clearance, thereby resulting in a narrow sealing gap 19 between them that prevents foreign objects from entering the space between these parts. In particular, foreign objects should be prevented from reaching rolling elements 15 since this may cause damage if the foreign objects enter the space between rolling elements 15 and assigned rolling surfaces 31a; 61a. To make it even more difficult for foreign objects to enter, sealing gap 19 is provided with a direction change 20 starting at outer surface 14 of linear motion device 10. Reference is also made here to reinforcing rib 78 on second body 70, which is used to increase the bending resistance of second body 70. Reinforcing rib 78 engages in rib recess 52 in first body 40, and so aforementioned narrow sealing gap 19 is also present in this region.

FIG. 2 also shows the T-shaped cross section of undercut sensor groove 41. Reference is likewise made to push tube 80 which will be described in greater detail with reference to FIG. 5. Push tube 80 is accommodated with slight clearance in a nut recess 56 of first body 40.

Figure 3:
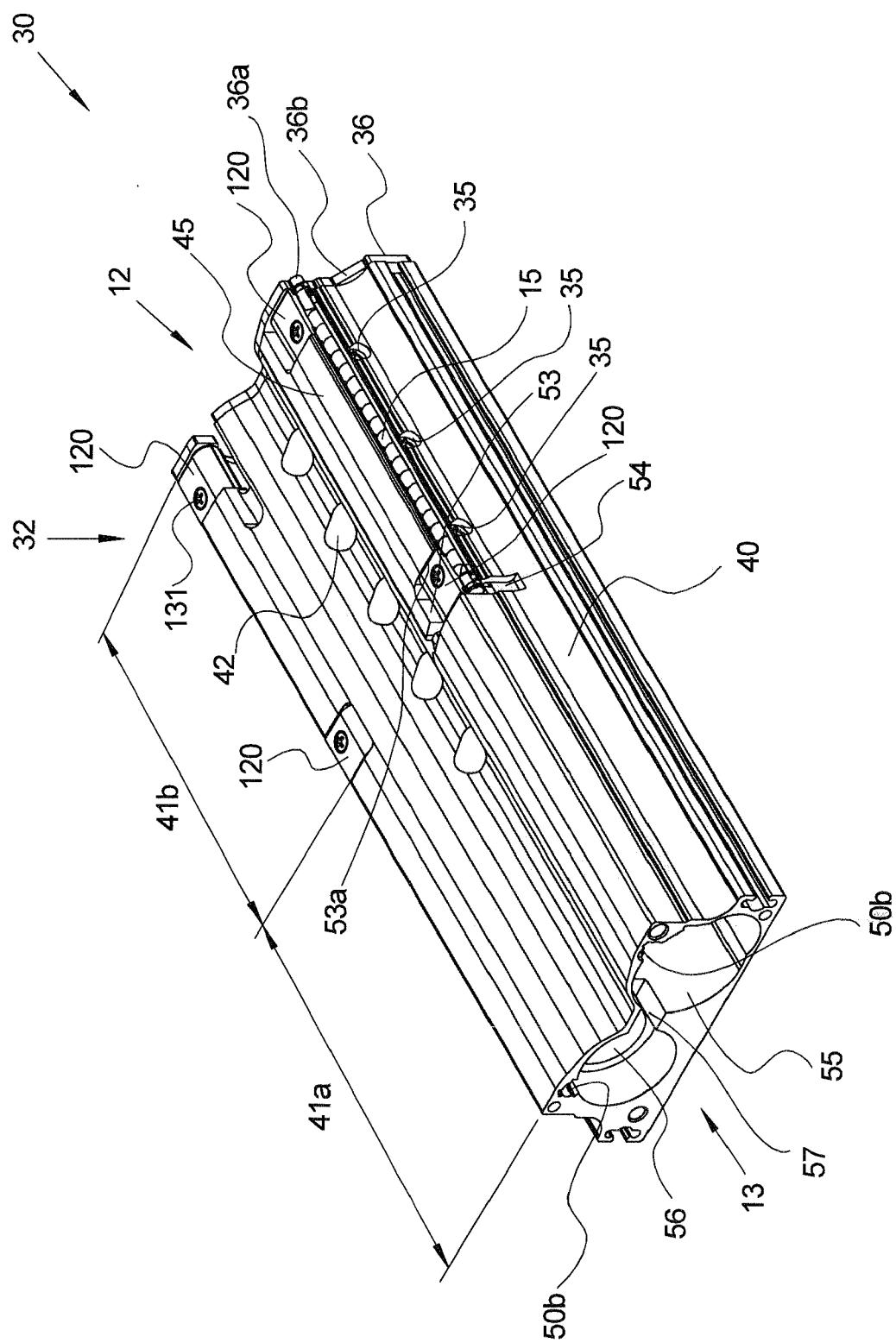
FIG. 3 shows a perspective view of the first assembly of the linear motion device depicted in FIG. 1.

FIG. 3 shows first assembly 30. First body 40 of first assembly 30 is divided into a first longitudinal section 40a and a second longitudinal section 40b which abut one another directly. Endlessly circulating rolling elements 15 described above are located in second longitudinal section 40b which is located on front end 12 of first assembly 30. FIG. 3 shows, in particular, the four circulatory assemblies 120, each of which includes a single, curved deflection passage (number 125; FIG. 7) which connects assigned first rolling surface (number 31a; FIG. 2) to assigned the return passage (number 50; FIG. 2). Deflection assemblies 120, which are identical in design, are configured such that they may be installed from a single installation side 32, and the related fastening contours 53 in first body 40 may also be created exclusively from installation side 32. Installation side 32 is the top side—as shown in FIG. 3—of first assembly 30. A deflection recess 53, which is formed using an end mill, is provided for each deflection assembly, as the fastening contour in first body 40. It should be noted here that the return passage (number 50; FIG. 2) extends along the entire length of the extruded raw part; the remainder 50b of the return passage, which does not perform a function in first longitudinal section 40a of first body 40, is shown in FIG. 2. Each of the four deflection assemblies 120 is fastened to first body 40 using a single screw bolt 131 which may also be screwed in from aforementioned installation side 32, and the assigned threaded bore may likewise be tapped from installation side 32. This embodiment of the rolling element return makes it possible to use one design of deflection assembly 120 in many different designs of linear motion devices 10.

Above-described adjustment section 45 of first body 40 is located on the right side in FIG. 3. It is shown, in particular, that three screw bolts 35 are provided for used to adjust the preload on the rolling elements. Transverse slot 54 and longitudinal slot (number 165; FIG. 2) are used to separate adjustment section 45 from base section 44 of first body 40, thereby ensuring that its adjustment motion is not hindered.

A separate closing plate 36, which is composed of steel sheet, is provided on front side 12 of first assembly 30. Closing plate 36 is designed to have slight, equidistant clearance from the second body (number 70; FIG. 2).

Figure 5:
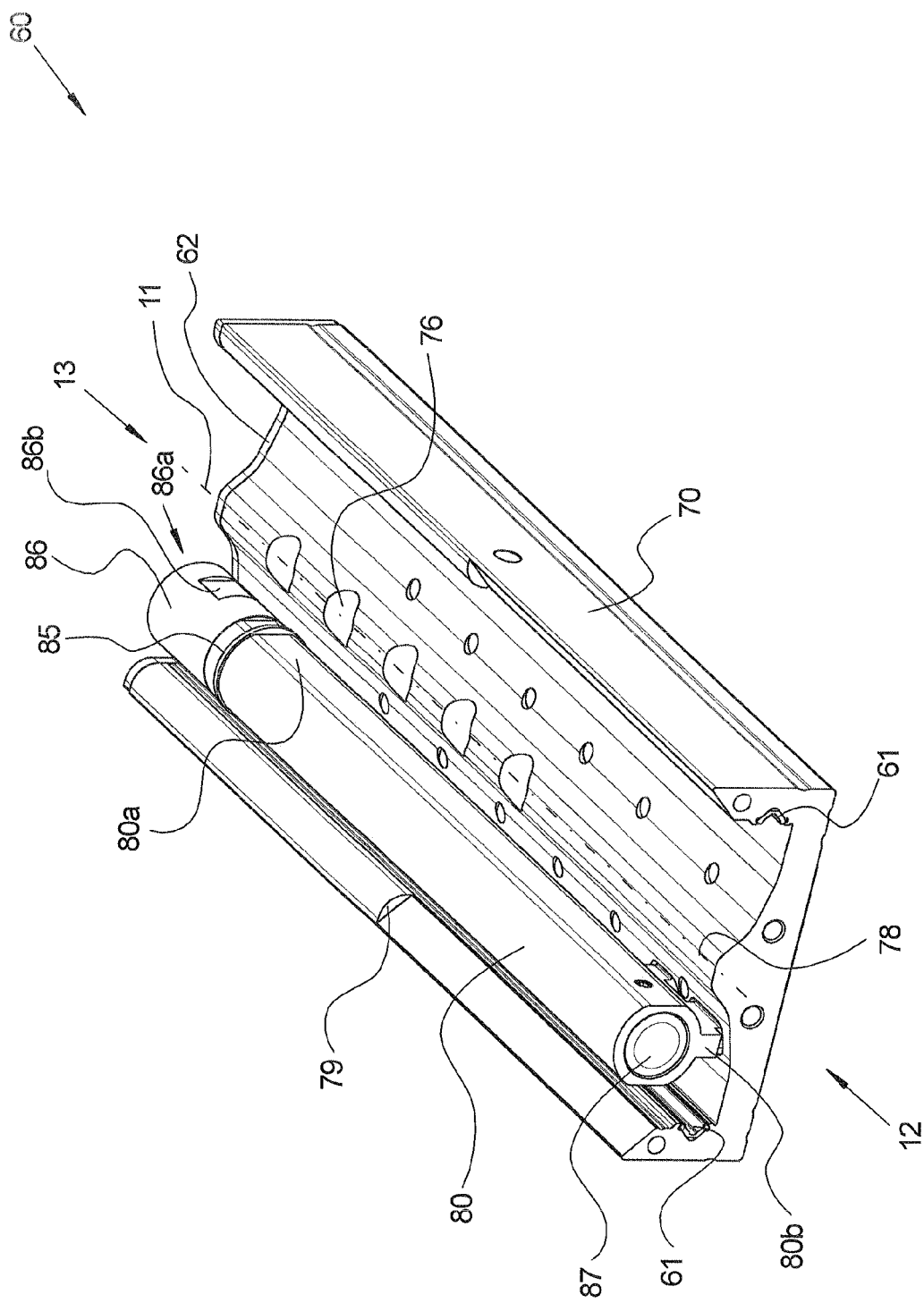
FIG. 5 shows a perspective view of the second assembly of the linear motion device depicted in FIG. 1.

Reference is made to stop section 36b of closing plate 36, which partly extends beyond first body 40, thereby enabling it to function as an end stop for the second assembly. To this end, a stop surface (number 79; FIG. 5) is provided on the second body, which extends transversely to the longitudinal direction, thereby ensuring that it may come to bear against stop section 36b. The stop surface is created by milling the end faces of the U-legs of the raw part of the first body accordingly. Reference is likewise made to stripper projection 36a which is adapted to the second rolling surface (number 61a; FIG. 2) of second assembly 60 with very little clearance. It is used to remove foreign objects such as metal chips from the second rolling surface, thereby preventing them from entering the rolling element circuit, where they may cause damage.

Figure 4:
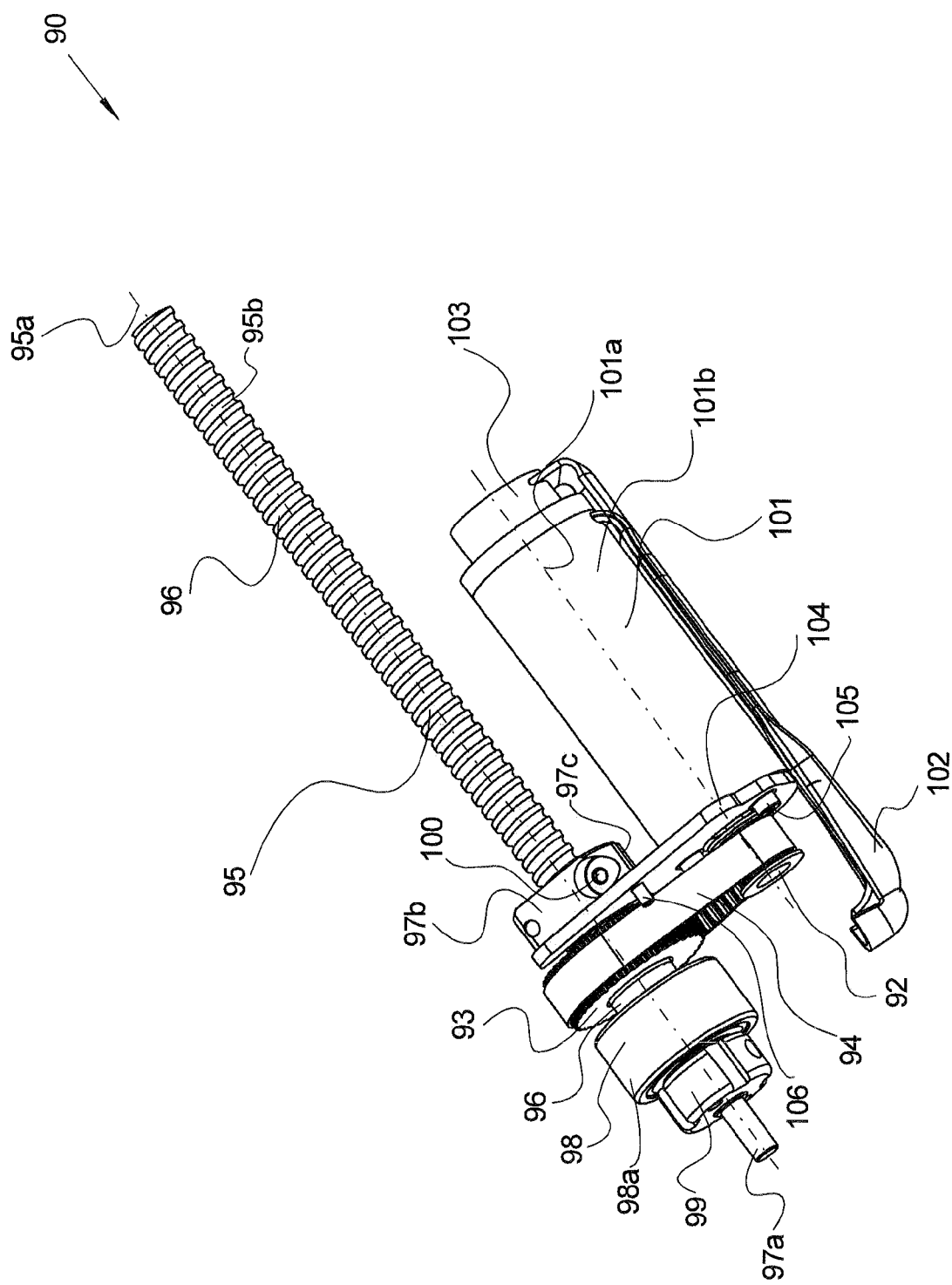
FIG. 4 shows a perspective view of the drive assembly of the linear motion device depicted in FIG. 1.

A motor recess 55 for accommodating the electric motor (number 101; FIG. 4) of the drive assembly is provided in first longitudinal section 40a of first body 40. Motor recess 55 is created entirely via milling since the flexurally resilient segments (number 47; FIG. 2) of the adjustment mechanism, which are used to adjust the preload of the rolling guide, are located at this point in the raw part of first body 40. The outer surface of first body 40 is not machined in first longitudinal section 40a, starting at the extruded raw part. This contour therefore had to be milled away in second longitudinal section 40b in order to provide the receiving recess (number 48; FIG. 2) in the first rolling surface part.

A nut recess 56 is provided next to motor recess 55, and extends along the entire length of first assembly 30; nut recess 56, together with motor recess 55, forms a drive cavity of the drive assembly (number 90; FIG. 4). Nut recess 56 is used to receive the threaded spindle (number 95; FIG. 4) of the drive assembly, and to receive the assigned push tube (number 80; FIG. 5) of the second assembly. Nut recess 56 and motor recess 55 are located, at least in sections, at the level (number 73; FIG. 2) of the U-legs of the second body, and so the linear motion device has a particularly low overall height.

Motor recess 55 is connected via an air exchange recess 57 to nut recess 56, and all aforementioned recesses are covered by the drive assembly (number 90; FIG. 1) in an air-tight manner. Therefore, the air that is displaced when the second assembly moves inward due to the motion of the nut and the push tube (number 80; FIG. 5) in nut recess 56 flows via air exchange recess 57 into motor recess 55, past the electric motor (number 101; FIG. 4), and via transverse slot 54 to the outside. When the second assembly moves outward, the air flows in the opposite direction. The electric motor is cooled by the air blowing past it, thereby making it possible to use a particularly small electric motor with a high power density.

Figure 3A:
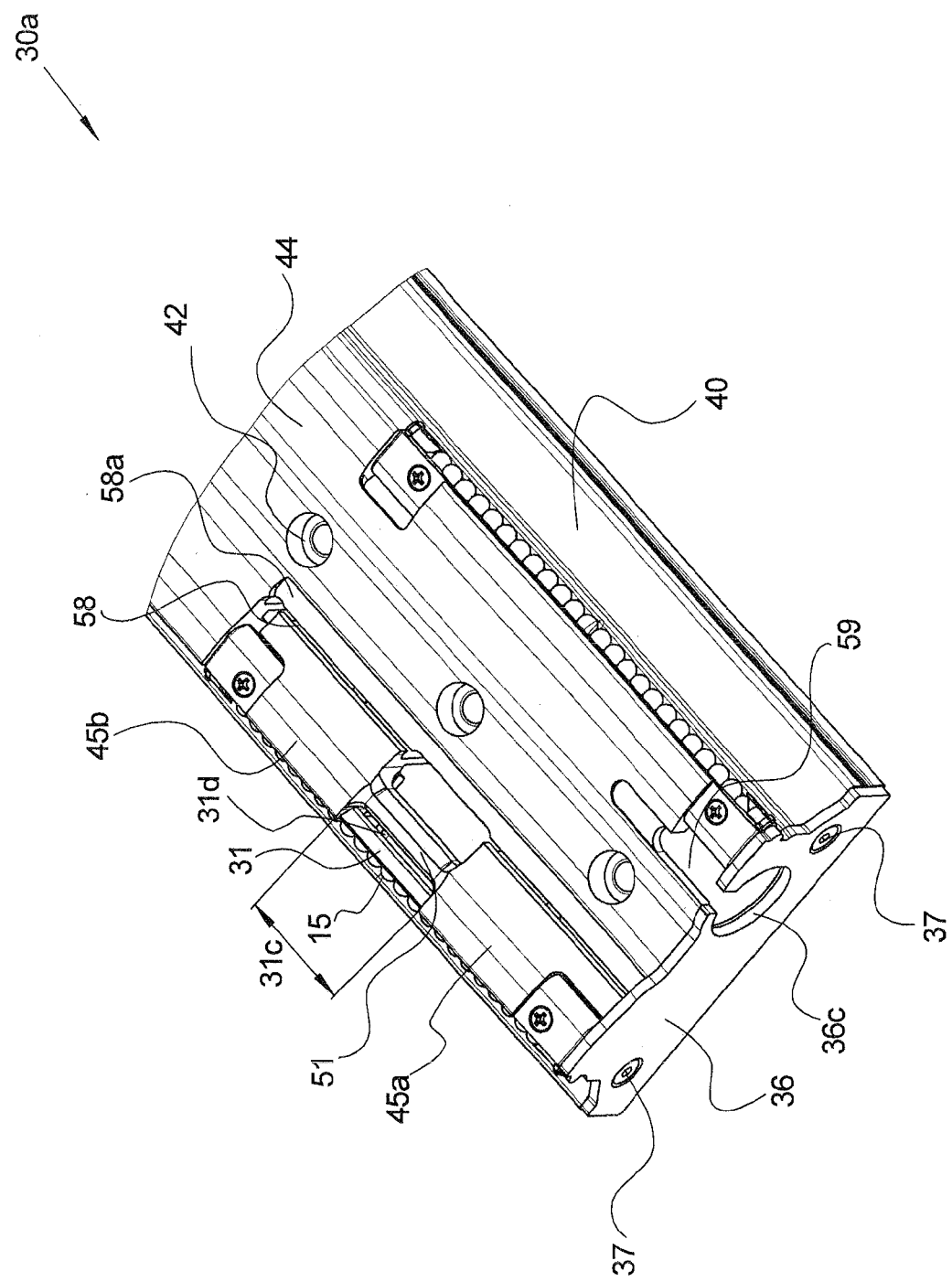
FIG. 3a shows a perspective partial view of a second embodiment of the first assembly depicted in FIG. 3.

FIG. 3a shows a second embodiment 30a of the first assembly. It differs from first embodiment 30 shown in FIG. 3 only in that adjustable, first rolling surface part 31 is not supported via a central longitudinal section 31c on first body 40. This measure was implemented to prevent a backup of the rolling elements due to the relatively long first rolling surfaces. The long length of the first rolling surfaces was selected so that first assembly 30a may stiffly support high torque loads.

Aforementioned central longitudinal section 31c is formed by milling away body 40 nearly entirely in this region, thereby forming a first adjustment section 45a and a second adjustment section 45b—which have clearance between them—of first main body 40. Therefore, there is absolutely no material left in the central longitudinal section 31c behind the first rolling surface part that could support it; a gap 31d therefore exists in central longitudinal section 31c between first rolling surface part 31 and first body 40.

Since first rolling surface part 31 has only relatively minor stiffness, rolling elements 15 that roll there are merely subjected to a minor load, thereby enabling them to be displaced in a gliding manner when rolling elements become backed up, thereby immediately eliminating the back-up of rolling elements.

First adjustment section 45a and second adjustment section 45b are connected to one another as a single piece only via return tube 51, in which return passage (number 50; FIG. 2) is located. Since the walls of return tube 51 are relatively thin, return tube 51 has a relative stiffness, thereby enabling first adjustment section 45a and second adjustment section 45b to be adjusted largely independently of one another, in order to adjust the preload of the roller guidance. It has proven favorable to provide first adjustment section 45a and second adjustment section 45b with only one adjustment means each, in the form of a screw bolt, since this makes it possible to adjust the preload in the quickest manner possible.

For the rest, the design of second embodiment 30a of the first assembly is identical to that of first embodiment 30. This applies, e.g., to milled-out dividing section 58a, via which a dividing gap 58 between adjustment section 45; 45a; 45b and base section 44 of first body 40 is formed, thereby ensuring that the adjustment section has the desired adjustability. FIG. 3a also shows fastening screws 37, via which closing plate 36 is fastened to first body 40. Finally, reference is likewise made to tapped bores 42, using which first assembly 30; 30a may be fastened to a higher-order assembly.

FIG. 4 shows drive assembly 90 which may be fastened as a whole to the rear longitudinal end of the first body; gearbox housing (number 91; FIG. 1) is not shown, for clarity. Drive assembly 90 includes electric motor 101 and threaded spindle 95, axes of rotation 95a; 101a of which are oriented parallel to one another. Electric motor 101 and threaded spindle 95 are connected in a rotationally driving manner via an endless toothed belt 94; the smaller, first toothed belt pulley 92 is located on electric motor 101, and the larger, second toothed belt pulley 93 is located on threaded spindle 95. Electric motor 101 is fastened via fastening screws 105 to a motor plate 104. This, in turn, may be fastened in various transverse positions to gearbox housing (number 91; FIG. 1), thereby making it possible to adjust the tension of the toothed belt required during operation by displacing electric motor 101. The appropriate position of motor plate 104 is secured using cylindrical pin 106 which engages in gearbox housing (number 91; FIG. 1) in a form-locked manner. Electric motor 101 is equipped with a rotary encoder 103, the signal of which is forwarded via electrical line 102 to a higher-order control (not depicted). Via electrical line 102, electric motor 101 is also supplied with electric current via higher-order control. Furthermore, electric motor 101 is equipped with a single motor housing 101b, and so the cooling air described above flows between motor housing 101b and motor recess (number 55; FIG. 3). This prevents foreign objects that have been drawn in via the cooling air from reaching the interior of electric motor 101.

Threaded spindle 95 includes a bearing part 97 and a threaded part 96. Threaded part 96 is a section of a ball screw spindle which is manufactured using a thread rolling method, and which is therefore provided with one or more thread turns 95b along its entire length. In thread rolling, threaded spindles having a length of several meters are usually manufactured. They are cut to the desired length to form threaded part 96, without any further machining being performed.

Bearing part 97 is connected to threaded part 96 via a clamping section 97b on bearing part 97, which acts directly on thread turns 95b of threaded part 96. For reasons of cost, thread turns 95b were not removed in the clamping region since sufficient clamping force is attained even without this measure. Clamping section 97b of bearing part 97 includes two clamping jaws that are separated from one another via a slot 97c; a clamping screw 100 extends through slot 97c in order to generate the desired clamping force.

Second toothed belt pulley 93 is designed as a separate component, is composed of aluminum, and is non-rotatably connected to bearing part 97 which is made of steel. Furthermore, a radial deep-groove ball bearing 98 is provided on bearing part 97, and is fixedly clamped to bearing part 97 via its inner ring using a groove nut 99. Outer ring 98a of radial roller bearing 98 is secured in the gearbox housing (number 91; FIG. 1). Threaded spindle 95 is equipped with only one pivot bearing. Accordingly, the present radial roller bearing is designed to include two rows, thereby ensuring that it has the required loadability. Segment 97a remaining on bearing part 97 may be used, e.g., to install a brake, using which threaded spindle 95 may be brought to a standstill.

FIG. 5 shows second assembly 60 in the form of the table part; the fastening part (number 82; FIG. 1), which is located on front longitudinal end face 12 of second body 70, is not shown, for clarity. Second assembly 60 includes second body 70 which extends via a U-shaped cross section in longitudinal direction 11. Furthermore, second assembly 60 includes a push tube 80 which is designed separate from second body 70 and includes a connecting segment 80b which is formed as a single piece therewith, and via which it is screwed to second body 70. In the rearmost position of second assembly 60, connecting segment 80b, which is provided on the front longitudinal end of push tube 80, engages in segment recess (number 59; FIG. 3a) of the first assembly, and push tube 80 simultaneously extends through its push tube opening (number 36c; FIG. 3a). Push tube 80 is composed of aluminum and is manufactured via extrusion; the front, end-face opening of push tube 80 is closed using a separate stopper 87 which is composed of plastic.

A threaded nut 86 in the form of a recirculating ball nut is mounted on rear longitudinal end 13 of the push tube, and is engaged in screw-type manner with the threaded spindle (number 95; FIG. 4) of the drive assembly. Threaded nut 86 is designed as a screw-in nut, i.e., it includes an internal thread on its front end, which is screwed onto a corresponding external thread on push tube 80. To ensure that the tightening torque of the screw connection is sufficient, threaded nut 86 and push tube 80 are each provided with a pair of opposing key surfaces 86*b*; 80*a*.

Furthermore, a gap seal 85, which is accommodated in a circumferential groove of push tube 80, is provided on rear end 13 of push tube 80. Gap seal 85 is interrupted only once in the circumferential direction, thereby enabling it to be easily installed on push tube 80. The purpose of gap seal 85 is to seal the nut recess (number 56; FIG. 3) at this point in a substantially air-tight manner in order to generate the above-described cooling-air flow. Gap seal 85 therefore bears substantially tightly against the nut recess. Threaded nut 86 is provided with a known end seal 86*a*, which bears against the threaded spindle (number 95; FIG. 4) only on the side facing away from the push tube. Threaded nut 86 is open on the opposite end, thereby resulting in a connection to the interior of push tube 80, which is filled with lubricating grease. In this manner, it is ensured that threaded nut 86 will be lubricated throughout its entire service life.

FIG. 5 also shows that reinforcing rib 78 and second rolling surface parts 61 extend along the entire length of second assembly 60. A longitudinal displacement of second rolling surface parts 61 in assigned receiving recess (number 74; FIG. 2) is prevented by stripper plate 62 and the fastening plate (number 82; FIG. 1).

Figure 6:
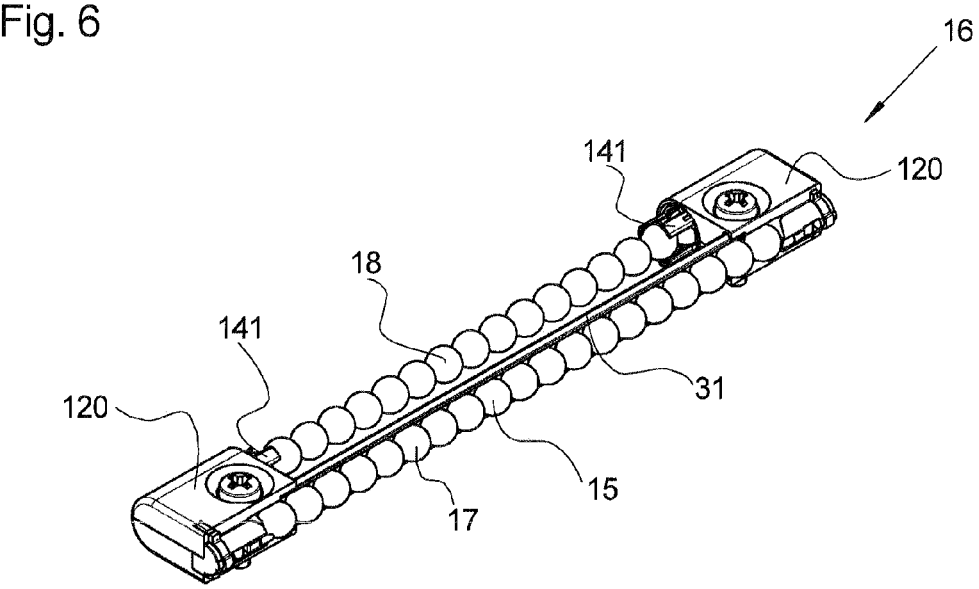
FIG. 6 shows a perspective view of a rolling element circuit without the enclosing first assembly.

FIG. 6 shows a rolling element circuit 16; the enclosing first assembly is not shown, for clarity. Rolling element circuit 16 encloses a row of spherical rolling elements 15, which is configured in the form of an endless loop. Load-bearing rolling elements 17 shown at the front in FIG. 6 roll on first rolling surface part 31 which engages via each of the two ends in a deflection assembly 120, in each of which one curved deflection passage (number 125; FIG. 7) is provided. For this purpose, every first rolling surface part 61 must extend past the first body (number 40; FIG. 3) in the longitudinal direction at both ends. Returning rolling bodies 18 shown at the rear in FIG. 6 roll in the return passage (number 50; FIG. 2) which is provided directly in the first body of the first assembly. To attain the best possible orientation between a deflection passage 120 and the assigned return passage, the former are provided with finger-type extensions 141 that engage in the return passage.

FIG. 7 shows an exploded view of deflection assembly 120. Deflection assembly 120 includes a first deflection part 121, and a second deflection part 122, which is composed of plastic; deflection parts 121 and 122 are designed largely as mirror-images relative to parting plane 123. Deflection parts 121; 122 both limit curved deflection passage 125 which connects the first rolling surface (number 31*a*; FIG. 2) to the return passage (number 50; FIG. 2). Curved deflection passage 125 has a circular cross-sectional shape that is sized such that the spherical rolling elements may pass through it with minimal play.

A lifting projection 128, via which the rolling elements are lifted away from the first rolling surface and transferred to the curved deflection passage, is provided on the end of curved deflection passage 125 that is assigned to the first rolling surface. Lifting projection 128, which is known per se, is formed exclusively on first deflection part 121, thereby enabling it to be situated at a particularly close distance to the first rolling surface. The position of deflection assembly 120 relative to the first rolling surface is defined via orientation recess 127, into which the corresponding first rolling surface part engages. One half of orientation recess 127 is provided on first deflection part 121, and the other half is provided on second deflection part 122, and each half is assigned to a V-leg (number 31*e*; 31*f* in FIG. 11) of the first rolling surface part.

Figure 8:
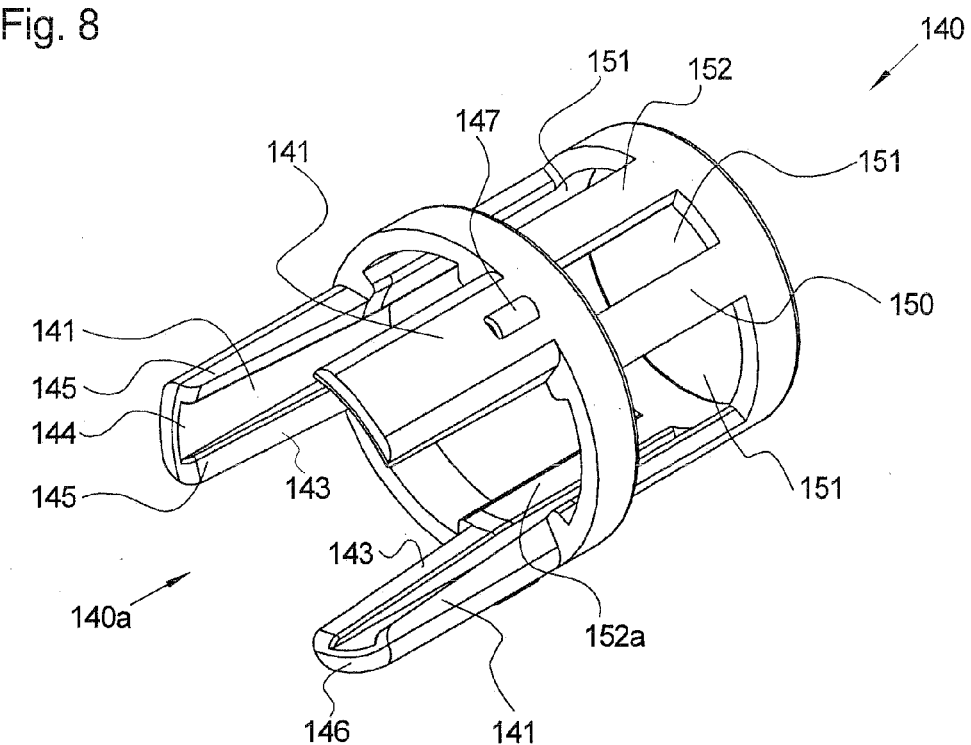
FIG. 8 shows a perspective view of the transfer part depicted in FIG. 7.

A separate transfer part 140, which is composed of plastic and will be described in greater detail with reference to FIGS. 8 and 9, is provided on the end of the curved deflection passage assigned to the return passage. Transfer part 140 is accommodated in a conical recess 126, the smallest diameter 126*a* of which is adapted to the assigned section of transfer piece 140 substantially without play. Due to the conical shape of aforementioned recess 126, some open space is available to flexible tube 150 of transfer part 140 in the transverse direction, thereby enabling it to bend accordingly in order to compensate for displacement between curved deflection passage 125 and the return passage. For this purpose, it engages via three finger-type extensions 141 into the adapted grooves (number 50*c*; FIG. 9) of the return passage. Transfer part 140 bears via end face 150*a* of flexible tube 150 against an assigned end face (number 53*a*; FIG. 3) of the first body, and so it is retained substantially without play in conical recess 126.

An opening 124 is formed in center of curvature 125*a* of the curved deflection passage in first deflection part 121 and in second deflection part 122, through which a fastening bolt 131 in the form of a screw bolt extends. In this manner, deflection parts 121; 122 are fixedly interconnected, and entire deflection assembly 120 is fastened to the first body. Instead of screw bolt 131, a blind rivet or a similar fastening bolt may be used, for instance, which may be installed exclusively from one side, namely the installation side (number 32; FIG. 3).

Furthermore, a lubricating system is provided in deflection assembly 120, which is formed of a first lubricating oil storage body 132 and a second lubricating oil storage body 133 which are composed of an open-cell foam. Lubricating oil storage bodies 132; 133 are each cut out of a panel-type material via water-jet cutting, and so they have the shape of a profiled element having a substantially constant cross section 132*a*; 132*b*. First lubricating oil storage body 132 has the larger volume, which is why it provides the majority of the storage volume for the lubricating oil. An application section 132*b* is formed as a single piece on first lubricating oil storage body 132, and extends into curved deflection passage 125, and so the rolling elements passing by run along it, by way of which lubricating oil is transferred from first lubricating oil storage body 132 to the rolling elements.

Second lubricating oil storage body 133 glides directly along the first rolling surface, thereby lubricating it and removing small dirt particles from it. The outer contour of stripper section 133*c* of second lubricating oil storage body 133 is adapted exactly to the cross-sectional profile of the first rolling surface. Cross-sectional planes 132*a*; 133*a* of first and second lubricating oil storage bodies 132; 133 are oriented perpendicularly to one another; second lubricating oil storage body 133 includes a projection 133*b*, via which it touches the first lubricating oil storage body, thereby enabling lubricating oil to be transferred from the first lubricating oil storage body to the second lubricating oil storage body. The intention is to distribute the entire stored quantity of lubricating oil onto the two lubricating points as needed. This may be attained by sizing aforementioned projection 133*b* in a suitable manner, in particular its contact faces to first lubricating oil storage body 132. Reference is likewise made to stripper plate 129, via which the relatively thin, second lubricating oil storage body is supported against bending. Stripper plate 129 is formed at a slight, equidistant distance from the first rolling surface, and, similar to lifting projection 128 which likewise supports the second lubricating oil storage body against bending, is formed entirely on first deflection part 121. Stripper plate 129 may also remove larger foreign objects from the first rolling surface, provided this has not already been done by the stripper projection (number 36a; FIG. 3) of the closing plate.

FIG. 8 shows transfer part 140 in a greatly enlarged view. Transfer part 140 is designed as a single piece, and is made of plastic using an injection-molding procedure. Transfer part 140 includes a flexible tube 150 that has a substantially circular cross-sectional shape, on the front end of which three identical finger-type extensions 141 are located equidistantly around the circumference of bendable tube 150. Finger-type extensions 141 have a U-shaped cross-sectional shape along their entire length, and they include a base 144 from which two U-legs 145 each extend at right angles. The end faces of the U-legs form guide surfaces 143 for the spherical rolling elements that pass through transfer part 140. The length of U-legs 145 increases from the free end of finger-type extensions 141 toward the flexible tube, and so aforementioned guide surfaces 143 are slanted relative to the course of the return passage. It should be noted that base 144 of finger-type extensions 141 is oriented parallel to the return passage, and it bears via a contact projection 147 directly against the base of the assigned groove (number 50c; FIG. 9) in the return passage. Reference is made to the embodiments described with reference to FIG. 9 in terms of the exact placement of guide surfaces 143 relative to the return passage.

Flexible tube 150 is provided with a total of six windows 151 in order to increase its flexural elasticity. The flexible tube therefore forms a flexible passage 140a for the rolling elements, via which a possible displacement between the return passage and the curved deflection passage may be compensated for. Segments 152 formed between windows 151 are extensions of U-legs 145 of finger-type extensions 141, and so guide surfaces 143 provided there for the rolling elements may be continued without interruption on segments 152a.

FIG. 9 shows a cross section of a return passage 50 with transfer part 140 inserted. Return passage 50 has a substantially circular cross-sectional shape that is adapted to rolling elements 15 with slight play. Three grooves 50c are distributed equidistantly around the circumference of return passage 50. Grooves 50c extend along the entire length of return passage 50 since it and grooves 50c are created during the extrusion of the first body, and they are not machined further. One finger-type extension 141 of deflection part 140 is accommodated in each of the grooves 50c; grooves 50c are designed to have slight clearance from finger-type extension 141. A contact projection 147 which bears against base 50d of groove 50c is provided on base 144 of each finger-type extension 141. Grooves 50c and contact projections 147 are matched to one another such that transfer part 140 is accommodated in return passage 50 with slight preload. Width 50f of grooves 50c is approximately 40% of ball diameter 15a, and so rolling elements 15 are still guided adequately in return passage 50 at a distance from grooves 50c.

Guide surfaces 143 for rolling elements 15 are shown with their slanted course in FIG. 9. The front end of each guide surface is situated so far way 143a from central axis 50a of return passage 50 that it is ensured to be recessed in groove 50c. It is therefore ruled out that rolling elements 15 that approach from return passage 50 and enter the curved deflection passage may collide with end face 146 of finger-type extensions 141.

The rear end of the guide surfaces on the finger-type extensions is situated so far away 143b from central axis 50a of return passage 50 that it extends out of assigned groove 50c by a small amount. It is therefore ruled out that rolling elements 15 that approach from the curved deflection passage and enter return passage 50 may collide with the end face of the first body (number 53a; FIG. 3). The aforementioned slight overhang is difficult to see due to its small size in FIG. 9 which is drawn to scale.

Figure 10:
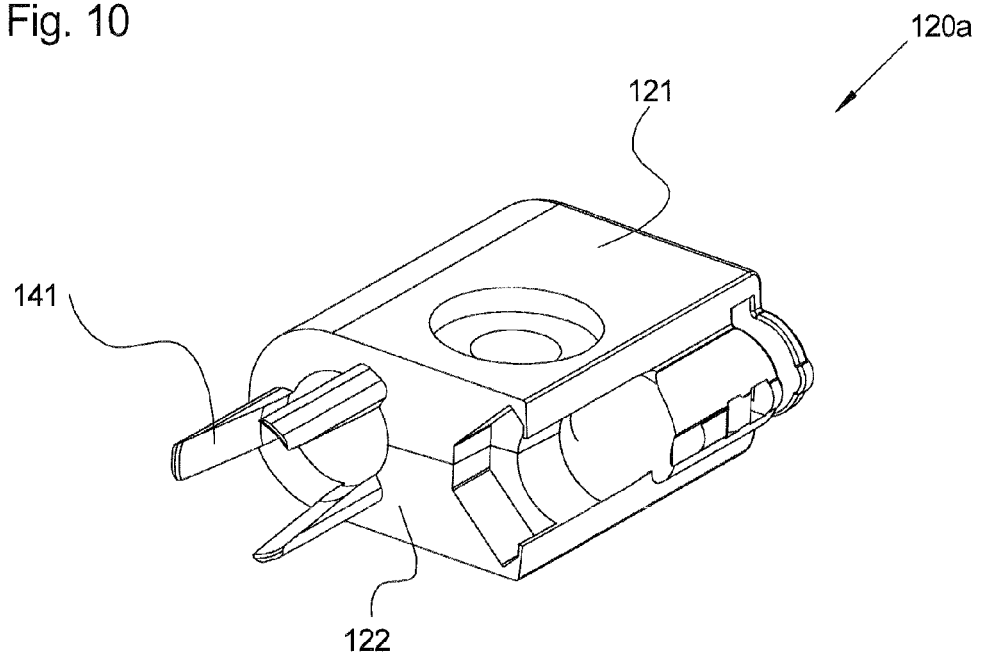
FIG. 10 shows a perspective view of a second embodiment of the deflection assembly.

FIG. 10 shows a second embodiment of deflection assembly 120a, in which, in contrast to first embodiment of the deflection assembly 120 shown in FIG. 7, finger-type extensions 141 are designed as a single piece with first deflection part 121 and second deflection part 122. The separate transfer part is therefore eliminated in this embodiment, and so second embodiment 120a is slightly more cost-favorable than first embodiment 120, although the advantages of the flexible passage (number 140a; FIG. 8) must be foregone. First embodiment 120 of the deflection assembly, which is otherwise identical to second assembly 120a, is preferred due to its advantages.

Figure 11:
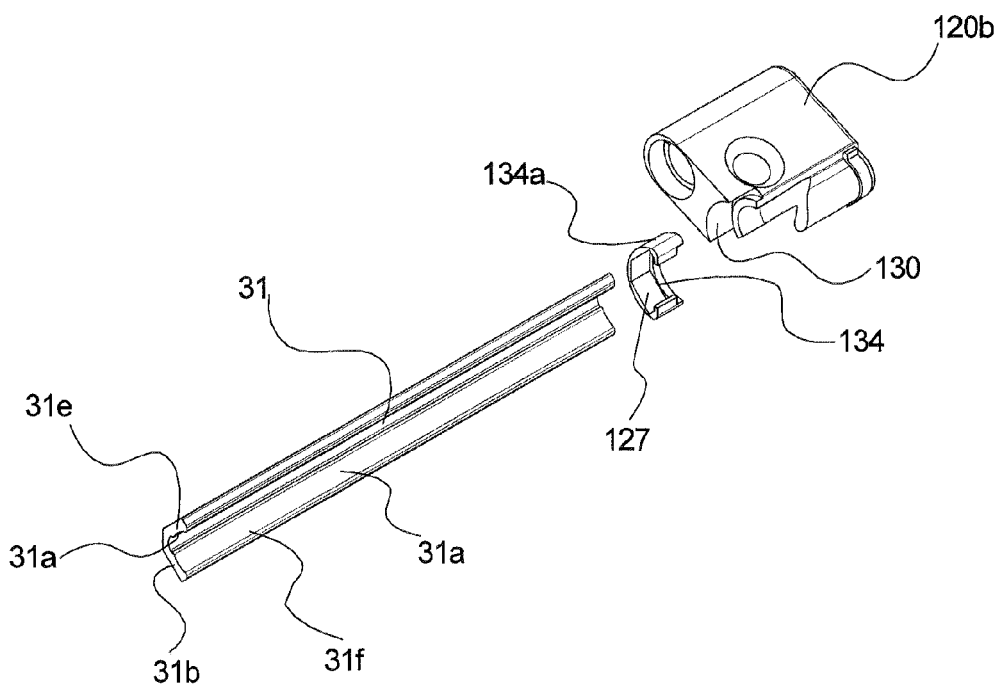
FIG. 11 shows an exploded view of a third embodiment of the deflection assembly.

FIG. 11 shows a third embodiment 120b of the deflection assembly, in which first rolling surface part 31 is rotatably accommodated in deflection assembly 120b. To this end, deflection assembly 120b includes a separate holding part 134, in which orientation recess 127 for the first rolling surface part is provided. As in all other embodiments of the deflection assembly, rolling surface part 31 is designed as a profiled element having a constant cross-sectional shape, and flat longitudinal end faces 31b are provided on both ends of the first rolling surface part. The cross-sectional shape of first rolling surface part 31 is substantially V-shaped, having a first V-leg 31e and a second V-leg 31f. On the outside, holding part 134 is provided with a circular-cylindrical surface 134a, the longitudinal axis of which extends through the midpoint of the spherical rolling elements. Circular-cylindrical surface 134a bears against a modified surface 130 of remaining deflection assembly 120b, and so first rolling surface part 31 is rotatable about the midpoint of the rolling elements relative to deflection assembly 120b. Via this measure, the same design of deflection assembly 120b may be used in various designs of linear motion devices. The purpose of the rotatability described above is to account for the different spacial conditions in the various linear motion devices. Nevertheless, first embodiment 120 of the deflection assembly, which is otherwise identical to third embodiment 120b of the deflection assembly, is preferred due to its ease of manufacture.

It will be understood that each of the elements described above, or two or more together, may also find a useful application in other types of constructions differing from the types described above.

While the invention has been illustrated and described as embodied in a linear motion device comprising projection-free return passage, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:
1. A linear motion device, comprising:
   a first assembly and a second assembly which is linearly movable relative to the first assembly;
   at least one first rolling surface extending in a longitudinal direction, provided on the first assembly and situated opposite a second rolling surface provided on the second assembly;

a row of rolling elements located between the first and second rolling surfaces, the first assembly including a single-pieced, first body and at least one deflection assembly;

at least one return passage provided in the first body;

at least one curved deflection passage located entirely within the deflection assembly and connecting the first rolling surface to the return passage in a manner such that the rolling elements circulate endlessly;

at least one projection engaging in the return passage and provided on the deflection assembly, wherein the return passage is provided completely and directly in the first body, the at least one projection of the deflection assembly extends in the longitudinal direction, such that a width of said at least one projection measured in a circumferential direction is less than a length of said at least one projection in the longitudinal direction, and the return passage includes a groove which is adapted to the at least one projection, and into which the at least one projection engages, wherein the at least one projection includes at least one guide surface that faces the rolling elements, is situated, at a front end of the at least one projection facing away from the deflection assembly, and recessed into the groove so far that the at least one guide surface is unable to come in contact with the rolling elements, wherein the guide surface is slanted relative to a course of the return passage, and, on the front end of the at least one projection, the guide surface is situated further from a central axis of the return passage than on an opposite, rear end of the at least one projection, and wherein the rolling elements are spherical rolling elements, and the at least one projection has a U-shaped cross section having a base and two U-legs, on each of end faces of which a guide surface is provided, a length of the U-legs increases from the front end toward the rear end of the at least one projection.

2. The linear motion device as recited in claim 1, wherein the groove extends along an entire length of the return passage.

3. The linear motion device as defined in claim 2, wherein the return passage has a substantially constant cross-sectional profile along its entire length.

4. The linear motion device as recited in claim 2, a width of the groove is between 10% and 60% of a ball diameter.

5. The linear motion device as recited in claim 1, wherein the at least one projection bears, at least in sections, against a bottom of the groove.

6. The linear motion device as recited in claim 1, wherein a flexible tube defines a flexible passage for the rolling elements, the at least one projection being provided on a front end of the flexible tube, an opposite, rear end of the flexible tube is fastened to the deflection assembly, and therefore the flexible passage leads into the deflection passage.

7. The linear motion device as recited in claim 6, wherein the flexible tube includes at least one radial window.

8. The linear motion device as recited in claim 7, wherein the flexible tube is accommodated in a conical recess of the deflection assembly.

9. The linear motion device as recited in claim 8, wherein an end face, which is adjacent to the at least one projection, of the flexible tube bears against the first body.

10. The linear motion device as recited in claim 7, wherein a plurality of radial windows is distributed around a circumference of the flexible tube, and the windows define segments in the flexible tube, the segments being situated in extension of the at least one projection.

11. The linear motion device as recited in claim 6, wherein the at least one projection and the flexible tube are designed as a single piece in a form of a separate transfer part.

12. The linear motion device as defined in claim 1, wherein the length of the U-legs increases from the front end and toward the rear end of the at least one projection in a constant manner.

13. A linear motion device, comprising:

a first assembly and a second assembly which is linearly movable relative to the first assembly;

at least one first rolling surface extending in a longitudinal direction, provided on the first assembly and situated opposite a second rolling surface provided on the second assembly;

a row of rolling elements located between the first and second rolling surfaces, the first assembly including a single-pieced, first body and at least one deflection assembly;

at least one return passage provided in the first body;

at least one curved deflection passage located entirely within the deflection assembly and connecting the first rolling surface to the return passage in a manner such that the rolling elements circulate endlessly;

at least one projection engaging in the return passage and provided on the deflection assembly, wherein the return passage is provided completely and directly in the first body, the at least one projection of the deflection assembly extends in the longitudinal direction, such that a width of said at least one projection measured in a circumferential direction is less than a length of said at least one projection in the longitudinal direction, and the return passage includes at least one groove which is adapted to the at least one projection, and into which the at least one projection engages, wherein said at least one projection comprises at least two projections provided that are distributed substantially equidistantly around a circumference of the return passage, and each of which engages in one of the at least one groove.

14. The linear motion device as recited in claim 13, wherein the rolling are balls, and exactly three of said at least one projection are provided.

15. The linear motion device as recited in claim 13, wherein all of said at least one projection and the at least one groove are identical in design.

* * * * *